Aug. 6, 1968  H. F. RYDSTRÖM  3,395,471
IMAGE REPRODUCING DEVICE FOR REMOTELY CONTROLLED
PRESENTATION OF AN IMAGE

Filed July 27, 1966  2 Sheets-Sheet 1

United States Patent Office 3,395,471
Patented Aug. 6, 1968

3,395,471
IMAGE REPRODUCING DEVICE FOR REMOTELY
CONTROLLED PRESENTATION OF AN IMAGE
Hans Fredrik Rydström, 17 Hagnasvagen,
Lidingö, Sweden
Filed July 27, 1966, Ser. No. 568,231
Claims priority, application Sweden, Apr. 26, 1963,
4,575/63
3 Claims. (Cl. 40—28)

ABSTRACT OF THE DISCLOSURE

An image reproducing device for remotely controlled presentation of an image in which a front surface of a contrast screen is defined by apertures of recesses each comprising at least one pressure sensitive contrast means, to which is attached a contrast element to be brought into a position adjacent the screen surface and a position remote from said surface. Movement of the contrast element between the two positions is effected by means of a bellow actuated by pneumatic means.

---

Figure 1:
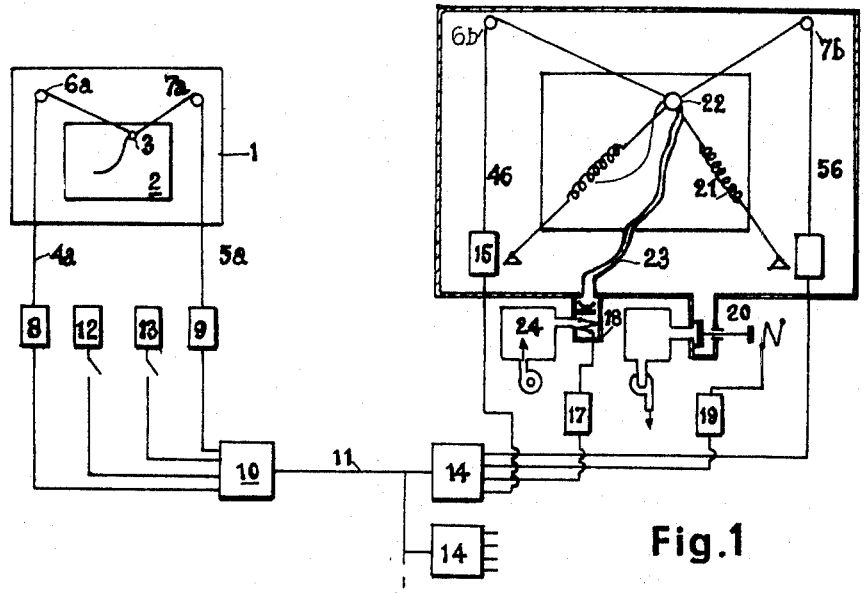

This application is a continuation-in-part of my co-pending application, Serial No. 362,347, filed April 24, 1964.

This invention relates to an improved image reproducing device for remotely controlled presentation of an image. It is particularly useful in a device having a contrast screen comprising a front surface defined by apertures of recesses arranged in a mosaic pattern and comprising in each of said recesses at least one pressure sensitive, pneumatically actuated contrast means provided with a movable non-black contrast element which is arranged so as to be moved into two different positions, a first position, the bright position, in which the contrast element is visible at the front screen surface, and a second position, the dark position, in which the contrast element is more remote from the screen surface than in the first position and essentially invisible at the front surface. The device further comprises means for the controllable application of pressure on each individual contrast means for bringing the element from one of said positions to the other and vice versa.

An object of the present invention is to provide a pressure sensitive contrast means with improved resistivity against weathering and deterioriation by influence of day light radiation.

A further object of the invention is to provide a contrast element comprising a plurality of individual contrast means, all having improved resistivity against weathering and the like and furthermore having the property of individually filling up, as viewed from the front surface of the screen, the aperture of the individual contrast element.

Other objects, features and advantages will become apparent as the description proceeds.

Figure 2:
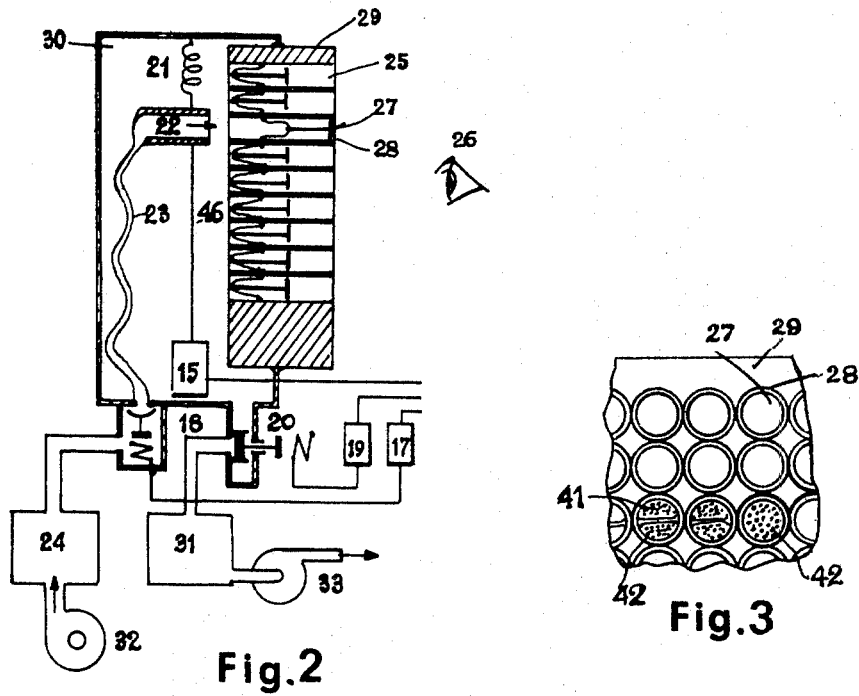
Figure 3:
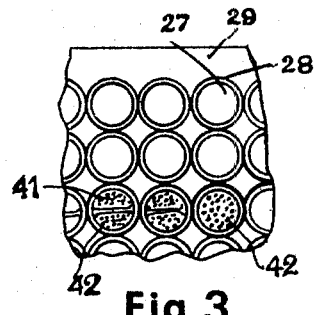
Figure 4:
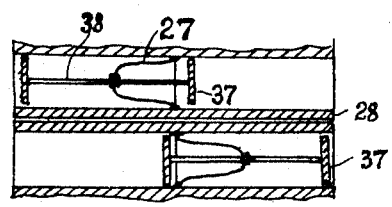
Figure 5:
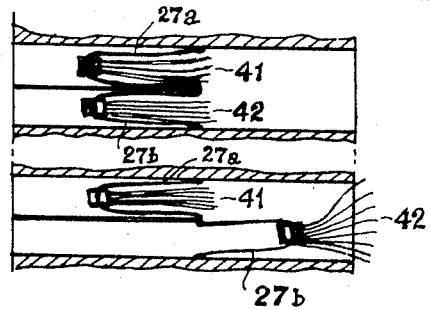

With reference now to the drawings in which like reference numerals designate like parts:

FIG. 1 illustrates schematically an embodiment of an image reproducing device for remotely controlled presentation of an image, of a kind in which contrast elements according to the invention can be used, FIG. 2 illustrates an embodiment of a scanning means for scanning a column of an image screen comprising contrast elements according to the invention, FIG. 3 is a detail of an image screen comprising circular cylindric contrast means as viewed from the front side of the screen, FIG. 4 is a longitudinal section through an embodiment of the contrast means according to the invention, and FIG. 5 is a longitudinal section through a further embodiment of a contrast means according to the invention.

With reference now to FIG. 1, 1 is a transmitter for generating control signals corresponding to a pattern that shall be reproduced by means of a device according to the invention. The invention is described in connection with FIG. 1 in general principle and it is to be understood that control signals for actuating individual contrast means of a reproduction mosaic arrangement according to the invention may be generated in any conceivable manner well known to the art for purposes of switching elements of a screen in order to reproduce a selected pattern or generating signals which selectively actuate means located on a reproduction screen in accordance with corresponding elements of a scanned pattern.

The transmitter comprises a scanning table 1 onto which an original pattern 2 to be scanned is arranged. A transmitter stylus 3 is connected to two coordinate signal generators, comprising wires 4a, 5a running via rollers 6a and 7a, respectively, to two coordinate calculators 8 and 9 respectively, which, in a manner well known per se in the art, generate signals representative for the location of the stylus. Said signals, which are thus representative for the coordinates of the stylus are transferred by a signal transfer device 10 via a transmission channel 11 to one or more receiving means, each comprising an image reproducing device according to the invention. Further, the transmitter comprises a contrast signal generator 12 and an erasing signal generator 13, said signal generators by means of individual switches 12a and 13a, respectively, being connected to said signal transfer device 10. Said signals, namely two coordinate determining signals, a contrast signal and an erasing signal may, for instance, be constituted by signals located within different frequency ranges, in which case the signal transfer device 10 may be a frequency signal mixer, the receiver or each of the receivers comprising an input circuit signal separator 14, having output terminals for said four signals.

The coordinate signals generated by the coordinate signal generators 8 and 9, respectively, constitute input signals to each slave servo system 15 and 16, respectively, of which only one is illustrated in FIG. 2, and which by means of wires 4b and 5b, respectively, and guide wheels 6b and 7b respectively control the position of a nozzle 22 for pressurized air, acting as a "stylus" in the receiver. Tension springs 21 keep the wires 4b and 5b, respectively, tensioned.

The contrast signal mentioned above actuates a contrast signal receiver 17, arranged so as to actuate a magnetically controlled valve 18, hereinafter called the contrast valve. The erasing signal mentioned above actuates an erasing signal receiver 19, arranged so as to actuate a magnetically controlled switch-over valve 20, hereinafter called the erasing valve.

The air nozzle 22 is, by means of a hose 23, connected to a source 24 of pressurized air via contrast valve 18.

Nozzle 22 is movable in a plane parallel to an image screen consisting of a plurality of contrast means 25, visible from its front side to a spectator 26.

Each contrast means 25 comprises an elastic bellow 27, which has a bright coloured front surface and is arranged in a dark recess. Each one of said recess 28 extend all way through a wall 29, which is dark on the side facing a spectator 26. Said contrast means 25 constitute wall elements of a chamber 30, which is connectable by means of the erasing valve 20 either to the open air or to a source 31 of a pressure below atmospheric pressure. The source of pressure air comprises a compressor or fan 32 and the source of pressure below atmospheric a suction pump or fan 33.

The device functions in the following manner: In rest position all contrast means 25 are in the dark position, in which the pressure sensitive members of said means, the elastic bellows 27 are all retracted into the dark recesses 28, in which position the bellows do not in any essential degree reflect light entering into the recess from outside back to the eyes of a spectator. A spectator will thus see the contrast screen as an essentially dark surface as long as all contrast means are in the "dark position."

If now the transmitter stylus 3 is moved in dependence of a pattern determined by the original figure to be reproduced, the air jet nozzle 22 will follow the movements of stylus 3 under the control of the means above described. If, during this movement, a signal is obtained from the contrast signal transmitter 12, this signal actuates contrast valve 18, so that a jet of pressurized air will leave the nozzle 22, this jet bringing the contrast members of the contrast means in front of the nozzle 22 from said second "dark" position to said first, "bright" position.

Due to the fact that, in this embodiment, the bright position as well as the dark one are mechanically stable ones, the picture remains on the contrast screen as long as the air pressure of chamber 30 does not essentially deviate from the pressure outside the screen.

To erase an image thus reproduced, the erasing signal generator 13 is switched on, the generator then delivering an erasing signal, which, via signal mixer 10, channel 11 and signal separator 14, actuates the erasing signal receiver 19, the output signal of which actuates a magnet coil of erasing valve 20, this valve then closing the connection between chamber 30 and the surrounding air and opening the connection between the chamber and the source 31 of subpressure. Thus the pressure in chamber 30 decreases, causing all those contrast elements which have earlier been brought in their bright position, to switch over to their dark position.

As illustrated in FIGS. 2-5 the contrast member comprises an external element 37 or 41, 42, respectively, connected to the bellow 27 in order to protect the bellow against weathering influences. Without such external elements arranged to cover the aperture of an individual contrast means, portions of the bellow are, with the contrast means in the bright position, exposed to day light radiation and other influence from the surrounding, leading to a comparatively fast deterioration of the bellow material, which, shall the contrast means fulfill its function properly, must retain its elastic property for a long period of time.

As illustrated in FIGS. 2 and 4, the element comprises a disk 37 carried by a rod 38 and guided in the recess 28 of a contrast means 25. The rod 38 is secured to the bellow 27 at a distance from the external element 37 so as to be located at a distance from the front aperture of the pertaining recess 28 as illustrated in FIG. 4 by the lowermost contrast means thereof. Rearwardly of the bellow 27, rod 38 carries a guide member 39 to hold the external element 37 properly when brought between bright and dark position, and vice versa.

FIG. 5 illustrates an embodiment of external element according to the invention particularly suited to be used to obtain a multicolor representation of an image, the contrast means each comprising two or more bellows and pertaining external elements. FIG. 3 shows, in the third horizontal row of contrast means from the top, three contrast means each comprising two bellows and external elements 41 and 42, respectively, each combined with a bellow having a separate duct 43 and 44 for actuation of the bellow between the two positions. Each of the external elements 41 and 42 consist of a plurality of resilient filaments attached at one end to the bellow and arranged so as to fill up the aperture of the contrast means to which it belongs when brought to the "bright" position. Together this plurality of filaments form a "brush." FIG. 3 shows three contrast means each comprising two contrast elements 41 and 42, respectively, each combined with its individual bellow 27a and 27b, respectively. In the right hand contrast means the external element 42 is illustrated when brought to "bright" position, while the contrast elements of two contrast means are retracted to "dark" position within the spaces 43 and 44, FIG. 5, on either side of an intermediate wall 45.

While the invention has been described in detail with respect to certain now preferred examples and embodiments thereof, it will be understood by those skilled in the art, that various changes and modifications may be made without departing from the spirit and scope of the invention, and it is intended, therefore, to cover all such changes and modifications in the attended claims.

What is claimed is:

1. Image reproducing device for remotely controlled presentation of an image comprising in combination a contrast screen having a front surface defined by apertures of recesses arranged in a mosaic pattern and comprising in each of said recesses at least one pressure sensitive contrast means, each of said contrast means comprising a movable non-black contrast element arranged so as to be moved into two different positions, a first position, the bright position, in which said contrast element is located adjacent the screen surface and is visible at said front surface, and a second position, the dark position, in which said contrast element is more remote from the screen surface than in said first position and essentially invisible at the front surface, and means for the controllable application of pressure on each individual contrast means for bringing said contrast element from one of said positions to the other and vice versa, said recesses each being an open ended recess, the contrast element of said contrast means comprising an elastic bellow, said bellow having a rim thereof airtightly secured to the internal walls of said open ended recesses, said means for the application of pressure on the contrast means comprising pneumatic means for individually bringing each one of said bellows from said second position in which a contrast surface of said contrast element is withdrawn from said screen surface and essentially invisible to said first position in which said contrast surface of said contrast element is located adjacent said aperture and visible as a surface element of said screen and vice versa, said contrast element further comprising a contrast member mechanically coupled to said bellow and arranged so as to be brought by said bellow into said first and second position.

2. Image reproducing device according to claim 1, in which said contrast member mechanically coupled to said bellow consists of a body having substantially the same cross section as said recess aperture of a contrast means.

3. Image reproducing device as claimed in claim 1, in which said contrast member mechanically coupled to said bellow comprises a plurality of filaments attached at one end to said bellow and extending substantially in the longitudinal direction of said recess from the bellow toward the aperture of said recess at said front surface.

References Cited

UNITED STATES PATENTS

| | | | |
|---|---|---|---|
| 3,346,977 | 10/1967 | Rydstrom | 40—28 |
| 1,171,397 | 2/1916 | Brady | 40—280 |
| 3,091,876 | 6/1963 | Cole | 40—28 X |
| 3,106,794 | 10/1963 | Le Goff | 40—28 |

EUGENE R. CAPOZIO, *Primary Examiner.*

W. J. CONTRERAS, *Assistant Examiner.*